(12) United States Patent
Li et al.

(10) Patent No.: US 11,357,365 B2
(45) Date of Patent: Jun. 14, 2022

(54) SOAP DISPENSER FOR USE IN SHOWER ROOM IN HOTEL BATHROOM

(71) Applicant: JIANGSU OPPEAL DAILY COSMETICS CORP., LTD, Yangzhou (CN)

(72) Inventors: Jingjing Li, Yangzhou (CN); Mingyang Chen, Yangzhou (CN); Aijun Luo, Yangzhou (CN)

(73) Assignee: JIANGSU OPPEAL DAILY COSMETICS CORP., LTD, Yangzhou (CN)

( * ) Notice: Subject to any disclaimer, the term of this patent is extended or adjusted under 35 U.S.C. 154(b) by 90 days.

(21) Appl. No.: 16/885,295

(22) Filed: May 28, 2020

(65) Prior Publication Data

US 2021/0076881 A1    Mar. 18, 2021

(30) Foreign Application Priority Data

Sep. 17, 2019    (CN) .......................... 201910877602.8

(51) Int. Cl.
*A47K 5/00*      (2006.01)
*A47K 5/122*     (2006.01)

(52) U.S. Cl.
CPC .......... *A47K 5/122* (2013.01); *A47K 2201/02* (2013.01)

(58) Field of Classification Search
CPC ............ A47K 2201/00; A47K 2201/02; A47K 5/1205; A47K 5/00; A47K 5/12; A47K 5/18; A47K 3/281; B65D 23/001; B65D 23/003; A47D 15/00; A47D 1/0085
USPC .................................... 222/173, 180, 153.01
See application file for complete search history.

(56) References Cited

U.S. PATENT DOCUMENTS

| 2,411,196 | A | * | 11/1946 | Dolan | A45C 11/008 |
|---|---|---|---|---|---|
| | | | | | 132/315 |
| 3,228,737 | A | * | 1/1966 | Kipnis | A47K 1/09 |
| | | | | | 312/206 |
| 5,183,182 | A | * | 2/1993 | Comstock | A47K 5/12 |
| | | | | | 222/129 |
| 5,232,190 | A | * | 8/1993 | Gould | B60N 3/102 |
| | | | | | 248/311.2 |
| 5,413,251 | A | * | 5/1995 | Adamson | A47K 5/1211 |
| | | | | | 222/129 |
| 5,586,800 | A | * | 12/1996 | Triplett | A47D 1/0085 |
| | | | | | 297/148 |

(Continued)

FOREIGN PATENT DOCUMENTS

| EP | 1103212 A1 | 5/2001 |
|---|---|---|
| WO | 2014209636 A1 | 12/2014 |

*Primary Examiner* — Charles P. Cheyney
(74) *Attorney, Agent, or Firm* — Bayramoglu Law Offices LLC (57) ABSTRACT

A soap dispenser for use in a shower room in a hotel bathroom, includes bottles for containing shampoo or shower gel, and a placement sheet, one side of the placement sheet is bent downward in an arc shape, placement rings are provided on the placement sheet, and a semicircular ring sheet is provided at each of the placement rings near the side of the placement sheet in the form of an arc-shaped surface; a fixing sheet is hinged to one end of the placement sheet, two snapping grooves are provided on the fixing sheet, an edge of each of the snapping grooves is butt-jointed with an edge of the respective semicircular ring sheet, and an edge of a bottom face of the snapping groove abuts against the placement ring.

6 Claims, 8 Drawing Sheets

(56) References Cited

U.S. PATENT DOCUMENTS

| | | | | |
|---|---|---|---|---|
| 6,041,974 | A * | 3/2000 | Poitras | A47K 5/12 |
| | | | | 222/173 |
| 6,082,593 | A * | 7/2000 | Borcherds | A47K 5/1207 |
| | | | | 222/181.3 |
| 6,296,331 | B1 * | 10/2001 | Tramontina | A47K 10/424 |
| | | | | 312/34.1 |
| 6,302,033 | B1 * | 10/2001 | Roudebush | A47D 1/0085 |
| | | | | 108/25 |
| 6,378,719 | B1 * | 4/2002 | Kaiser | B67D 1/08 |
| | | | | 220/4.22 |
| D591,560 | S * | 5/2009 | Lackey | D12/419 |
| 7,992,714 | B1 * | 8/2011 | Devault | A47G 19/10 |
| | | | | 206/564 |
| 9,064,434 | B2 * | 6/2015 | Alford | G09F 23/06 |
| 2011/0132930 | A1 | 6/2011 | Haworth et al. | |
| 2011/0259920 | A1 | 10/2011 | Occitane | |
| 2017/0119178 | A1 * | 5/2017 | Markwick | A47K 10/18 |

* cited by examiner

SOAP DISPENSER FOR USE IN SHOWER ROOM IN HOTEL BATHROOM

CROSS REFERENCES TO THE RELATED APPLICATIONS

This application is based upon and claims priority to Chinese Patent Application No. 201910877602.8, filed on Sep. 17, 2019, the entire contents of which are incorporated herein by reference.

TECHNICAL FIELD

An embodiment of the present invention relates to the technical field of hotel daily necessities, and in particular to a soap dispenser for use in a shower room in a hotel bathroom.

BACKGROUND

Currently, separate bathrooms and washrooms are generally provided in hotels. In order to facilitate people in checking in and washing, products such as shampoo and shower gel are generally placed in the washroom for people to use directly during washing.

Now when placing the shampoo or shower gel in the hotels, a placement sheet is generally installed on a wall of a shower stall, and then the shampoo bottle or shower gel bottle is directly placed on the placement sheet, people can directly squeeze the shampoo or shower gel for use when taking a shower. However, some people will directly take away the shampoo and shower gel from the hotel when they leave the hotel, causing a certain loss to the hotel.

SUMMARY

To this end, an embodiment of the present invention provides a soap dispenser for use in a shower room in a hotel bathroom, to solve the problem in the prior art of the bottled shampoo or shower gel placed in a hotel shower stall being often taken away by a person causing a certain loss to the hotel.

In order to achieve the above object, the embodiments of the present invention provide the following technical solutions.

A soap dispenser for use in a shower room in a hotel bathroom, comprising: a plurality of bottles for containing a shampoo or a shower gel, and a placement sheet, wherein a side of the placement sheet is bent downward in an arc shape, two placement rings are provided on the placement sheet in a horizontal direction, and a semicircular ring sheet is provided at each of the two placement rings adjacent to the side of the placement sheet in a form of an arc-shaped surface; a fixing sheet is hinged to one end of the placement sheet, two semicircular snapping grooves are provided on the fixing sheet, an edge of each of the two semicircular snapping grooves is butt-jointed with an edge of the semicircular ring sheet, and an edge of a bottom face of a semicircular snapping groove of the two semicircular snapping grooves abuts against an upper end face of a placement ring or the two placement rings;

an edge of an upper end of the semicircular snapping groove of the two semicircular snapping grooves is integrally connected to a snapping sheet; a mounting block is integrally connected to a bottom of each of the plurality of bottles, an annular groove is provided at an edge of the mounting block, the edge of the mounting block at the bottom of a bottle of the plurality of bottles abuts against an edge of the semicircular ring sheet, and the snapping sheet is snapped into the annular groove; and a locking structure is provided between an end of the fixing sheet and the placement sheet;

wherein the locking structure comprises a locking portion and an unlocking portion, the unlocking portion is a magnet, the locking portion comprises a sleeve provided at the end of the placement sheet, a limiting block and a magnetic bar are provided inside the sleeve, the limiting block is fixed to an edge of an upper end of the sleeve, and a through hole is provided in a middle portion of the limiting block;

the magnetic bar penetrates the through hole and extends to an upper end of the limiting block, a back-springing sheet is fixedly connected to the magnetic bar inside the sleeve, and a spring is sleeved to the magnetic bar at a lower end of the back-springing sheet; a lower end of the spring abuts against a bottom of the sleeve, and an upper end of the spring abuts against the back-springing sheet; the end of the fixing sheet not hinged to the placement sheet is provided with a notch, a locking sheet is fixed on an edge of the notch, and the locking sheet is provided with a locking hole; and after the fixing sheet is snapped to the placement sheet, an upper end of the magnetic bar is snapped into the locking hole.

A soap dispenser for use in a shower room in a hotel bathroom, comprising: a plurality of bottles for containing a shampoo or a shower gel, and a placement sheet, wherein a side of the placement sheet is bent downward in an arc shape, two placement rings are provided on the placement sheet in a horizontal direction, and a semicircular ring sheet is provided at each of the two placement rings adjacent to the side of the placement sheet in a form of an arc-shaped surface; a fixing sheet is hinged to one end of the placement sheet, two semicircular snapping grooves are provided on the fixing sheet, an edge of each of the two semicircular snapping grooves is butt-jointed with an edge of the semicircular ring sheet, and an edge of a bottom face of a semicircular snapping groove of the two semicircular snapping grooves abuts against an upper end face of a placement ring or the two placement rings; an edge of an upper end of the semicircular snapping groove of the two semicircular snapping grooves is integrally connected to a snapping sheet;

a mounting block is integrally connected to a bottom of each of the plurality of bottles, an annular groove is provided at an edge of the mounting block, the edge of the mounting block at the bottom of a bottle of the plurality of bottles abuts against an edge of the semicircular ring sheet, and the snapping sheet is snapped into the annular groove; and a locking structure is provided between an end of the fixing sheet and the placement sheet;

further comprising a mounting sheet provided in a vertical direction, wherein an side of the placement sheet in a form of an arc-shaped surface is fixedly connected to a bottom of the placement sheet, a receiving block is fixed between the semicircular ring sheet and the placement sheet, and a threaded hole is provided between the receiving block and the placement sheet.

A soap dispenser for use in a shower room in a hotel bathroom, comprising: a plurality of bottles for containing a shampoo or a shower gel, and a placement sheet, wherein a side of the placement sheet is bent downward in an arc shape, two placement rings are provided on the placement sheet in a horizontal direction, and a semicircular ring sheet is provided at each of the two placement rings adjacent to the side of the placement sheet in a form of an arc-shaped surface; a fixing sheet is hinged to one end of the placement sheet, two semicircular snapping grooves are provided on the fixing sheet, an edge of each of the two semicircular snapping grooves is butt-jointed with an edge of the semicircular ring sheet, and an edge of a bottom face of a semicircular snapping groove of the two semicircular snapping grooves abuts against an upper end face of a placement ring or the two placement rings; an edge of an upper end of the semicircular snapping groove of the two semicircular snapping grooves is integrally connected to a snapping sheet;

a mounting block is integrally connected to a bottom of each of the plurality of bottles, an annular groove is provided at an edge of the mounting block, the edge of the mounting block at the bottom of a bottle of the plurality of bottles abuts against an edge of the semicircular ring sheet, and the snapping sheet is snapped into the annular groove; and a locking structure is provided between an end of the fixing sheet and the placement sheet;

wherein a lower surface of the cover plate is fixed to an upper end of the mounting sheet via an adhesive, the lower surface of the cover plate is fixed to upper ends of the two positioning sheets via the adhesive and the lower surface of the cover plate is fixed to upper ends of semicircular ring sheet via the adhesive; and the cover plate is provided with a circular hole at a position corresponding to each placement ring of the two placement rings.

The embodiments of the present invention have the following advantages: with the provision of the soap dispenser, after the bottles containing the shampoo or shower gel are placed on the placement sheet, the fixing sheet is rotated such that the snapping sheets are snapped into the annular grooves at the bottom of the bottles, and the fixing sheets are fixed to the placement sheet, the battles can be stably fixed to the placement sheet, so that when the fixing structure is not opened, the bottles containing the shampoo or shower gel cannot be disengaged from the placement sheet, so as to prevent the bottles from being directly taken away by people, and when the bottles need to be replaced, the staff can directly open the locking structure and rotate the fixing sheet to remove the bottles therefrom and replace them, making the operation more convenient.

BRIEF DESCRIPTION OF THE DRAWINGS

To describe the technical solutions in the implementations of the present invention or in the prior art more clearly, the following briefly introduces the accompanying drawings required for describing the implementations or the prior art. It is obvious that the drawings in the following description are merely exemplary, and for those of ordinary skill in the art, other implementation drawings would have been derived from the extension of the provided drawings without involving any inventive effort.

The structures, proportions, sizes and the like depicted in this specification are only used to fit with the content disclosed in the specification for understanding and reading by those skilled in the art, but are not intended to limit the limitation conditions that can be implemented in the present invention, and thus have no technically substantive meaning. Any of the modification of structure, the change of proportional relationship or the adjustment of size should fall within the scope covered by the technical content disclosed in the present invention without affecting the effects produced and the object achievable by the present invention.

In the figures: 10. Bottle; 11. Mounting block; 12. Annular groove; 20. Placement sheet; 21. Placement ring; 22. Semicircular ring sheet; 23. Water penetration slot; 30. Fixing sheet; 31. Snapping groove; 32. Snapping sheet; 40. Sleeving tube; 41. Sleeve; 42. Limiting block; 43. Magnetic bar; 44. Back-springing sheet; 45. Spring; 46. Notch; 47. Locking sheet; 48. Magnet; 50. Mounting sheet; 51. Receiving block; 52. Threaded hole; 60. Positioning sheet; 70. Cover plate; 80. Water delivery hole; 81. Water discharge hole.

DETAILED DESCRIPTION OF THE EMBODIMENTS

The embodiments of the present invention are illustrated below by using the specific embodiments, and those skilled in the art would have readily understood other advantages and effects of the present invention from the disclosure of this description, and it is obvious that the described embodiments are some of the embodiments of the present invention rather than all the embodiments. Based on the embodiments of the present invention, all other embodiments obtained by those of ordinary skill in the art without involving any inventive effort fall within the scope of protection of the present invention.

A soap dispenser for use in a shower room in a hotel bathroom, as shown in FIGS. 1-5, comprises bottles 10 for containing shampoo or shower gel, and further comprises a placement sheet 20, wherein one side of the placement sheet 20 is bent downward in an arc shape, two circular placement rings 21 are fixedly connected to the placement sheet 20 in a horizontal direction, and a semicircular ring sheet 22 is integrally connected to each of the placement rings 21 near the side of the placement sheet 20 in the form of an arc-shaped surface; a fixing sheet 30 having the same length as the placement sheet 20 is provided on the other side of the placement sheet 20, and one end of the fixing sheet 30 is hinged to the placement sheet 20; two semicircular snapping grooves 31 are provided on the fixing sheet 30, an edge of each of the snapping grooves 31 is butt-jointed with an edge of the respective semicircular ring sheet 22, and an edge of a bottom face of the snapping groove 31 abuts against an upper end face of the placement ring 21; an edge of an upper end of the snapping groove 31 is also integrally connected to a snapping sheet 32, and a bottom face of the snapping sheet 32 is higher than the upper end face of the placement ring 21; a mounting block 11 is integrally connected to the bottom of each of the bottles 10, and an annular groove 12 is provided at an edge of the mounting block 11; after the mounting block 11 at the bottom of the bottle 10 is placed in the placement ring 21, the edge of the mounting block 11 abuts against an edge of the semicircular ring sheet 22, and the snapping sheet 32 is snapped into the annular groove 12; and a locking structure is provided between the other end of the fixing sheet 30 and the placement sheet 20.

In this way, when the bottle 10 containing the shower gel or shampoo needs to placed on this placement sheet 20, the locking structure can be opened first, and the fixing sheet 30 is then rotated to disengage the snapping sheet 32 from the placement ring 21. At this time, the bottle 10 can be placed directly at the position of the placement ring 21, and the edge of the mounting block 11 can be snapped onto the semicircular ring sheet 22, and the fixing sheet 30 is then rotated in a reverse direction, such that the edge of the snapping groove 31 is butt-jointed with the edge of the semicircular ring sheet 22, and at the same time, the snapping sheet 32 is snapped into the annular groove 12 of the mounting block 11. Finally, the fixing sheet 30 is fixed to the placement sheet 20 by using the locking structure. Since the snapping sheet 32 is snapped into the annular groove 12, the bottle 10 is stably fixed on the placement sheet 20 and cannot be taken out, thereby preventing the bottle 10 from being directly taken away by people, while not affecting the normal use of the shower gel or shampoo contained in the bottle 10 by the people.

Figure 5:
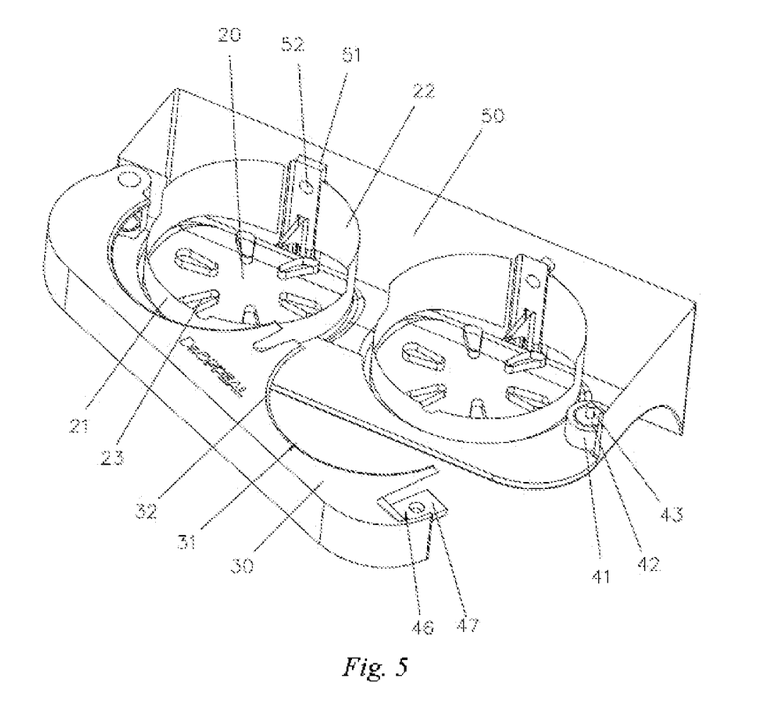
FIG. 5 is a schematic structural diagram of the soap dispenser provided in the embodiment of the present invention with the cover plate being removed and a fixing sheet being rotated.
Figure 7:
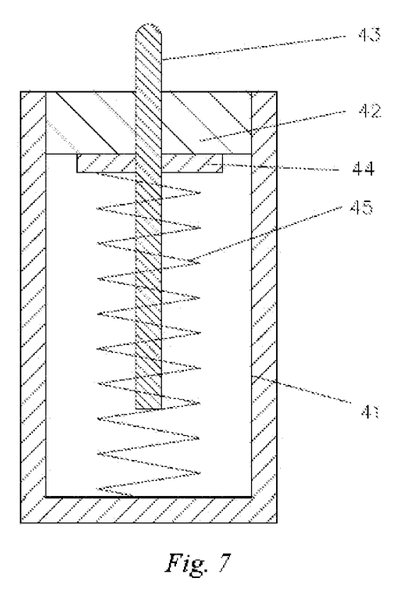
FIG. 7 is a schematic cross-sectional structural diagram of a sleeve of the soap dispenser provided in the embodiment of the present invention.
Figure 8:
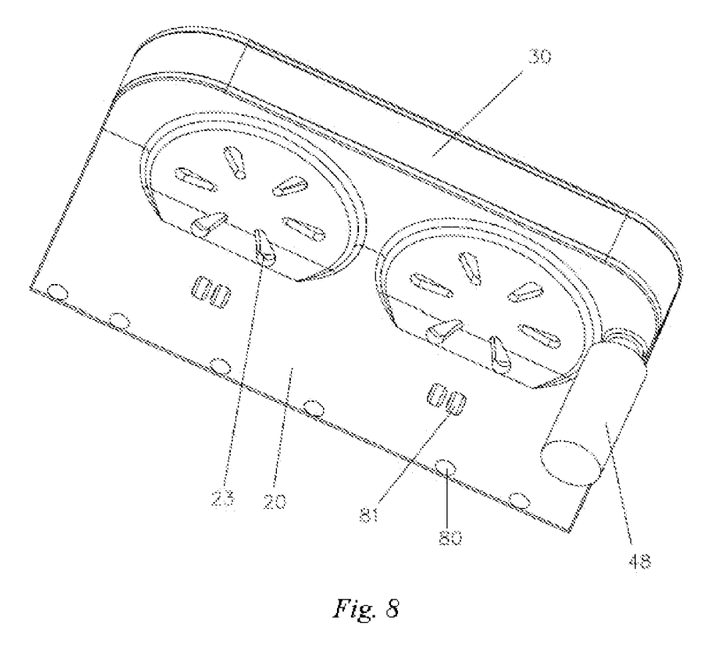
FIG. 8 is a schematic structural diagram from the bottom of the soap dispenser provided in the embodiment of the present invention.

As shown in FIGS. 5, 7 and 8, the locking structure comprises a locking portion and an unlocking portion, wherein the unlocking portion is a magnet 48, the locking portion comprises a sleeve 41 fixed to one end of the placement sheet 20, and a limiting block 42 and a magnetic bar 43 are provided inside the sleeve 41, wherein the limiting block 42 is fixedly connected to an edge of an upper end of the sleeve 41, and a through hole is provided in a middle portion of the limiting block 42. An upper end of the magnetic bar 43 penetrates the through hole and extends out of an upper end face of the limiting block 42, and a lower end of the magnetic bar is located at a lower end of the limiting block 42 but is not in contact with the bottom of the sleeve 41. A back-springing sheet 44 is fixedly connected to the magnetic bar 43 inside the sleeve 41, and a spring 45 is sleeved to the magnetic bar 43 at a lower end of the back-springing sheet 44. A lower end of the spring 45 abuts against the bottom of the sleeve 41, and the upper end of the spring abuts against the back-springing sheet 44. In addition, the end of the fixing sheet 30 that is not hinged to the placement sheet 20 is provided with a notch 46, and a locking sheet 47 is fixed on an edge of the notch 46. The locking sheet 47 is provided with a locking hole. After the fixing sheet 30 is snapped to the placement sheet 20, the locking sheet 47 will be pressed against an upper end face of the sleeve 41, and an upper end of the magnetic bar 43 is snapped into the locking hole.

After the fixing sheet 30 is snapped to the placement sheet 20, the locking sheet 47 is pressed against the upper end face of the sleeve 41, and the upper end of the magnetic bar 43 is snapped into the locking hole, such that the locking sheet 47 can be fixed, and the fixing sheet 30 is fixed on the placement sheet 20 and cannot move. When the fixing sheet needs to be opened, since the magnetic bar 43 has a certain elasticity, a staff can place the magnet 48 at the bottom end of the sleeve 41, such that the magnetic bar 43 can be retracted, and the upper end of the magnetic bar 43 is disengaged from the locking hole. At this time, the fixing sheet 30 can be rotated to open same. After the magnet 48 is removed, the spring 45 pushes the magnetic rod 43 back to the original position again. In this way, it is more convenient when opening and closing the locking structure.

In addition, a slope is provided on an edge of a lower surface of a front end of the locking sheet 47, such that after the fixing sheet 30 is snapped onto the placement sheet 20, the front end of the locking sheet 47 comes into contact with the magnetic bar 43, due to the provision of the slope of the front end of the locking sheet 47, the locking sheet 47 can first press the magnetic bar 43 to retract, and after the fixing sheet 30 is fully pressed against the placement sheet 20, the upper end of the magnetic bar 43 just faces the locking hole, such that the magnetic bar 43 is ejected and snapped into the locking hole.

As shown in FIG. 5, the soap dispenser further comprises a mounting sheet 50 provided in a vertical direction, wherein the edge of the placement sheet 20 on the arc-shaped side is fixedly connected to a bottom edge of the placement sheet 20, a receiving block 51 is fixedly connected between the semicircular ring sheet 22 and the placement sheet 20, a groove is provided at a position where the semicircular ring sheet 22 and the receiving block 51 are connected, and a threaded hole 52 is provided between the receiving block 51 and the placement sheet 20 and the semicircular ring sheet 22. In this way, when the placement sheet 20 is mounted, the mounting sheet 50 can abut against a wall of the hotel shower stall where the mounting needs to be performed, a bolt then passes through the threaded hole 52 and is inserted into the wall, and the mounting sheet 50 can be stably fixed to the wall, such that the placement sheet 20 is stably fixed to a designated position.

Figure 6:
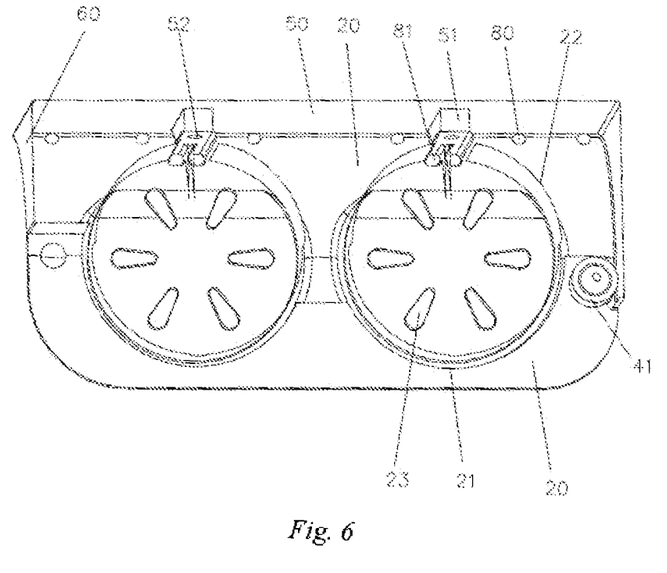
FIG. 6 is a schematic structural diagram of the soap dispenser provided in the embodiment of the present invention with the cover plate and the fixing sheet being removed.

As shown in FIG. 6, a plurality of water penetration slots 23 are uniformly and circumferentially distributed on the placement sheet 20 at the placement ring 21. Since this soap dispenser is installed in the shower stall, after some water flows to the placement sheet 20, the water can be discharged through the water penetration slots 23.

In addition, a plurality of water delivery holes 80 are provided at a position where the mounting sheet 50 and the placement sheet 20 are connected to each other. Since the position where the placement sheet 20 is connected to the mounting sheet 50 is arc-shaped, after the water falls on the placement sheet 20, most of the water will flow to the position where the placement sheet 20 is connected to the mounting sheet 50, and the water can then be discharged through the water delivery holes 80. A plurality of water discharge holes 81 are provided at an arc-shaped position where the placement ring 21 is connected to the placement sheet 20, such that when water flows to the arc-shaped position where the placement ring 21 is connected to the placement sheet 20, water entering the placement ring 21 can be sufficiently discharged from the water discharge holes 81.

As shown in FIG. 6, a positioning sheet 60 is fixedly connected to either end of the placement sheet 20 respectively, one end of each of the two positioning sheets 60 is fixedly connected to an end portion of the mounting sheet 50 respectively, and the other end thereof abuts against an edge of the fixing sheet 30. In this way, the connection strength between the mounting sheet 50 and the placement sheet 20 can be enhanced, preventing the opening and closing of the connection between the placement sheet 20 and the mounting sheet 50.

Figure 1:
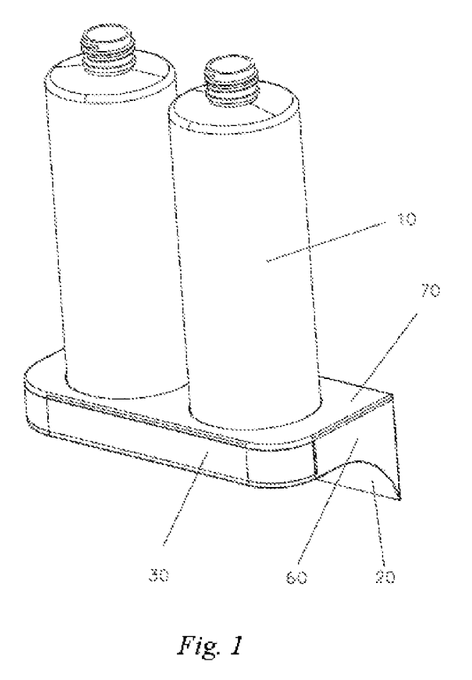
FIG. 1 is a schematic diagram of the overall structure of a soap dispenser provided in an embodiment of the present invention.
Figure 2:
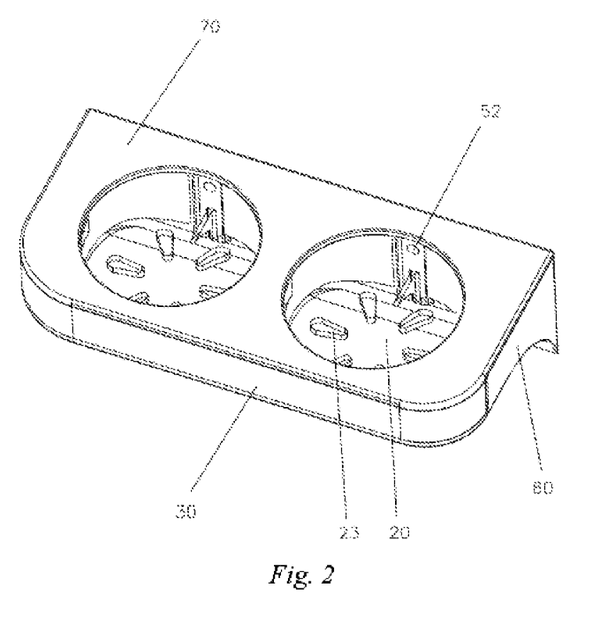
FIG. 2 is a schematic structural diagram of the soap dispenser provided in the embodiment of the present invention with bottles being removed.
Figure 3:
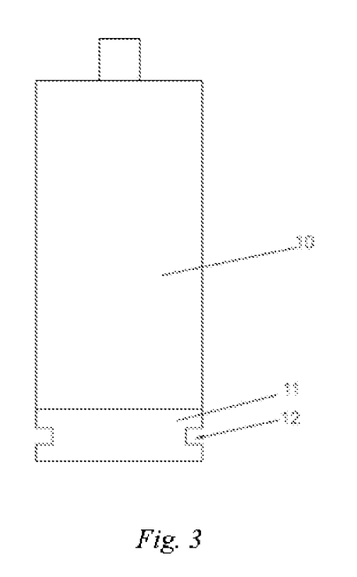
FIG. 3 is a schematic front structural diagram of a bottle of the soap dispenser provided in the embodiment of the present invention.
Figure 4:
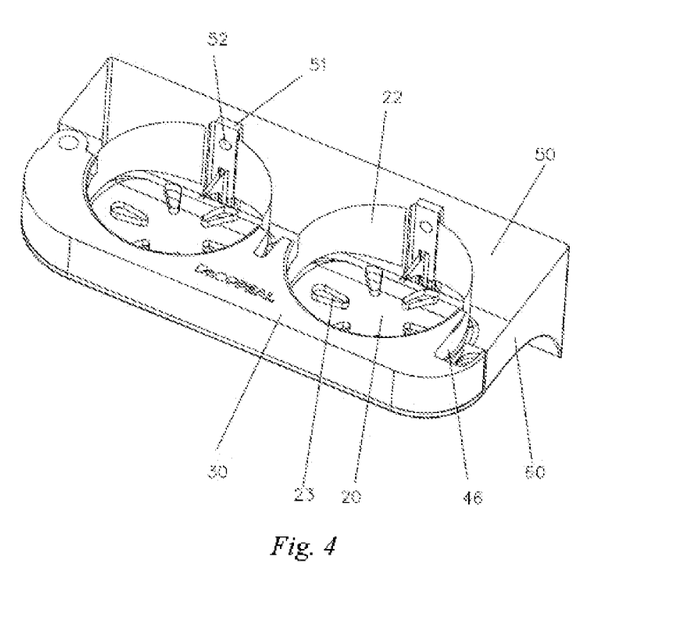
FIG. 4 is a schematic structural diagram of the soap dispenser provided in the embodiment of the present invention with a cover plate being removed.

As shown in FIG. 2, a cover plate 70 is provided at top ends of the mounting sheet 50 and the positioning sheets 60, and the cover plate 70 is provided with a circular hole at a position corresponding to each placement ring 21. With the provision of the cover plate 70 and in combination with the positioning sheets 60 at the two ends of the mounting sheet 50, some structures on the placement sheet 20 can be covered to prevent these structures on the placement sheet 20 from being touched by guests in the hotel, while the circular hole provided in the cover plate 70 will not affect the placement of the bottle 10.

A lower surface of the cover plate 70 is fixedly bonded, via an adhesive, to upper end edges of the mounting sheet 50, the positioning sheets 60 and the semicircular ring sheets 22, such that after the cover plate 70 is connected to and covers upper ends of the mounting sheet 50 and the positioning sheets 60, the cover plate 70 can be stably fixed to the upper ends of the mounting sheet 50 and the positioning sheets 60, while the cover plate 70 is only pressed against the upper end face of the fixing sheet 30, so as not to affect the rotation of the fixing sheet 30.

With the provision of the soap dispenser of the present invention, after the bottles 10 containing the shampoo or shower gel are placed on the placement sheet 20, the fixing sheet 30 is rotated such that the snapping sheets 32 are snapped into the annular grooves 12 at the bottom of the bottles 10, and the fixing sheets 30 are fixed to the placement sheet 20, the bottles 10 can be stably fixed to the placement sheet 20, so that when the fixing structure is not opened, the bottles 10 containing the shampoo or shower gel can not be disengaged from the placement sheet 20, so as to prevent the bottles 10 from being directly taken away by people, and when the bottles 10 need to be replaced, the staff can directly open the locking structure and rotate the fixing sheet 30 to remove the bottles 10 therefrom and replace them, making the operation more convenient.

Although the present invention has been described in detail above with the general description and particular embodiments, on the basis of the present invention, some modifications or improvements can be made thereto, which would have been obvious to those skilled in the art. Therefore, these modifications or improvements made without departing from the spirit of the present invention all fall within the scope of protection of the present invention.

What is claimed is:

1. A soap dispenser for use in a shower room in a hotel bathroom, comprising:
   a plurality of bottles for containing a shampoo or a shower gel, and a placement sheet, wherein a side of the placement sheet is bent downward in an arc shape, two placement rings are provided on the placement sheet in a horizontal direction, and a semicircular ring sheet is provided at each of the two placement rings adjacent to the side of the placement sheet in a form of an arc-shaped surface; a fixing sheet is hinged to one end of the placement sheet, two semicircular snapping grooves are provided on the fixing sheet, an edge of each of the two semicircular snapping grooves is butt-jointed with an edge of the semicircular ring sheet, and an edge of a bottom face of a semicircular snapping groove of the two semicircular snapping grooves abuts against an upper end face of a placement ring or the two placement rings; an edge of an upper end of the semicircular snapping groove of the two semicircular snapping grooves is integrally connected to a snapping sheet; a mounting block is integrally connected to a bottom of each of the plurality of bottles, an annular groove is provided at an edge of the mounting block, the edge of the mounting block at the bottom of a bottle of the plurality of bottles abuts against an edge of the semicircular ring sheet, and the snapping sheet is snapped into the annular groove; and a locking structure is provided between an end of the fixing sheet and the placement sheet;
   wherein the locking structure comprises a locking portion and an unlocking portion, the unlocking portion is a magnet, the locking portion comprises a sleeve provided at the end of the placement sheet, a limiting block and a magnetic bar are provided inside the sleeve, the limiting block is fixed to an edge of an upper end of the sleeve, and a through hole is provided in a middle portion of the limiting block; the magnetic bar penetrates the through hole and extends to an upper end of the limiting block, a back-springing sheet is fixedly connected to the magnetic bar inside the sleeve, and a spring is sleeved to the magnetic bar at a lower end of the back-springing sheet; a lower end of the spring abuts against a bottom of the sleeve, and an upper end of the spring abuts against the back-springing sheet; the end of the fixing sheet not hinged to the placement sheet is provided with a notch, a locking sheet is fixed on an edge of the notch, and the locking sheet is provided with a locking hole; and after the fixing sheet is snapped to the placement sheet, an upper end of the magnetic bar is snapped into the locking hole.

2. A soap dispenser for use in a shower room in a hotel bathroom, comprising:
   a plurality of bottles for containing a shampoo or a shower gel, and a placement sheet, wherein a side of the placement sheet is bent downward in an arc shape, two placement rings are provided on the placement sheet in a horizontal direction, and a semicircular ring sheet is provided at each of the two placement rings adjacent to the side of the placement sheet in a form of an arc-shaped surface; a fixing sheet is hinged to one end of the placement sheet, two semicircular snapping grooves are provided on the fixing sheet, an edge of each of the two semicircular snapping grooves is butt-jointed with an edge of the semicircular ring sheet, and an edge of a bottom face of a semicircular snapping groove of the two semicircular snapping grooves abuts against an upper end face of a placement ring or the two placement rings; an edge of an upper end of the semicircular snapping groove of the two semicircular snapping grooves is integrally connected to a snapping sheet; a mounting block is integrally connected to a bottom of each of the plurality of bottles, an annular groove is provided at an edge of the mounting block, the edge of the mounting block at the bottom of a bottle of the plurality of bottles abuts against an edge of the semicircular ring sheet, and the snapping sheet is snapped into the annular groove; and a locking structure is provided between an end of the fixing sheet and the placement sheet;
   further comprising a mounting sheet provided in a vertical direction, wherein a side of the placement sheet in a form of the arc-shaped surface is fixedly connected to a bottom of the placement sheet, a receiving block is fixed between the semicircular ring sheet and the placement sheet, and a threaded hole is provided between the receiving block and the placement sheet.

3. A soap dispenser for use in a shower room in a hotel bathroom, comprising:
   a plurality of bottles for containing a shampoo or a shower gel, and a placement sheet, wherein a side of the placement sheet is bent downward in an arc shape, two placement rings are provided on the placement sheet in a horizontal direction, and a semicircular ring sheet is provided at each of the two placement rings adjacent to the side of the placement sheet in a form of an arc-shaped surface, a fixing sheet is hinged to one end of the placement sheet, two semicircular snapping grooves are provided on the fixing sheet, an edge of each of the two semicircular snapping grooves is butt-jointed with an edge of the semicircular ring sheet, and an edge of a bottom face of a semicircular snapping groove of the two semicircular snapping grooves abuts against an upper end face of a placement ring or the two placement rings, an edge of an upper end of the semicircular snapping groove of the two semicircular snapping grooves is integrally connected to a snapping sheet, a mounting block is integrally connected to a bottom of each of the plurality of bottles, an annular groove is provided at an edge of the mounting block the edge of the mounting block at the bottom of a bottle of the plurality of bottles abuts against an edge of the semicircular ring sheet, and the snapping sheet is snapped into the annular groove; and a locking structure is provided between an end of the fixing sheet and the placement sheet;

a positioning sheet being one of two positioning sheets is fixedly connected to an end of the placement sheet, a first end of each positioning sheet of the two positioning sheets is fixedly connected to a mounting sheet, and a second end of the each positioning sheet abuts against an edge of the fixing sheet;

wherein a lower surface of the cover plate is fixed to an upper end of the mounting sheet via an adhesive, the lower surface of the cover plate is fixed to upper ends of the two positioning sheets via the adhesive and the lower surface of the cover plate is fixed to upper ends of semicircular ring sheet via the adhesive; and the cover plate is provided with a circular hole at a position corresponding to each placement ring of the two placement rings.

4. The soap dispenser for use in the shower room in the hotel bathroom according to claim 1, wherein a plurality of water penetration slots are uniformly and circumferentially distributed on the placement sheet at the placement ring of the two placement rings.

5. The soap dispenser for use in the shower room in the hotel bathroom according to claim 1, wherein a plurality of water delivery holes are provided at a connecting position between the mounting sheet and the placement sheet.

6. The soap dispenser for use in the shower room in the hotel bathroom according to claim 1, wherein a plurality of water discharge holes are provided at an arc-shaped connecting position between the placement ring and the placement sheet.

* * * * *